(12) United States Patent
Elcock et al.

(10) Patent No.: US 12,315,504 B2
(45) Date of Patent: May 27, 2025

(54) SYSTEM AND METHOD FOR CONTROLLING A MEDIA DEVICE TO PROVIDE AN IMPROVED SONIC ENVIRONMENT FOR THE RECEPTION OF A VOICE COMMAND

(71) Applicant: ARRIS ENTERPRISES LLC, Suwanee, GA (US)

(72) Inventors: Albert Fitzgerald Elcock, West Chester, PA (US); Christopher S. Del Sordo, Souderton, PA (US); Charles R. Hardt, Lawrenceville, GA (US)

(73) Assignee: ARRIS Enterprises LLC, Horsham, PA (US)

( * ) Notice: Subject to any disclaimer, the term of this patent is extended or adjusted under 35 U.S.C. 154(b) by 325 days.

(21) Appl. No.: 17/477,826

(22) Filed: Sep. 17, 2021

(65) Prior Publication Data
US 2022/0108695 A1 Apr. 7, 2022

Related U.S. Application Data

(60) Provisional application No. 63/086,402, filed on Oct. 1, 2020.

(51) Int. Cl.
*G10L 15/22* (2006.01)
(52) U.S. Cl.
CPC ........ *G10L 15/22* (2013.01); *G10L 2015/223* (2013.01)
(58) Field of Classification Search
CPC .......................... G10L 15/22; G10L 2015/223
See application file for complete search history.

(56) References Cited

U.S. PATENT DOCUMENTS

| 5,983,186 A | * | 11/1999 | Miyazawa | G10L 15/26 704/E15.045 |
| 9,898,250 B1 | * | 2/2018 | Williams | G10L 15/22 |
| 9,916,839 B1 | * | 3/2018 | Scalise | G10L 15/22 |
| 9,922,646 B1 | * | 3/2018 | Blanksteen | G06F 3/167 |
| 2001/0041980 A1 | * | 11/2001 | Howard | H04N 21/4394 704/E15.045 |
| 2015/0243287 A1 | * | 8/2015 | Nakano | G10L 15/30 704/246 |

(Continued)

OTHER PUBLICATIONS

International Search Report and Written Opinion for Application No. PCT/US2021/050823 Mailed Dec. 27, 2021.

*Primary Examiner* — Brian L Albertalli
(74) *Attorney, Agent, or Firm* — Panitch Schwarze Belisario & Nadel LLC

(57) ABSTRACT

A system and method for controlling media systems identified as co-located with one or more voice-command responsive devices. The disclosed technology is responsive to predetermined activation and/or deactivation phrases so as to control the audio output of the identified media systems and provide an improved sonic environment for a voice command to be properly received and interpreted by the voice-command responsive device(s). The activation phrase for the disclosed system and method can be the same one utilized by the co-located voice-command responsive devices, thereby providing a user with an intuitive and substantially immediate means of improving the sonic environment prior to issuing one or more voice commands.

20 Claims, 3 Drawing Sheets

(56) References Cited

U.S. PATENT DOCUMENTS

| | | | |
|---|---|---|---|
| 2016/0125895 A1* | 5/2016 | Gandhi | G10L 25/48 704/275 |
| 2017/0245051 A1* | 8/2017 | Lang | H04W 8/24 |
| 2017/0345422 A1* | 11/2017 | Yang | G06F 3/167 |
| 2018/0240457 A1* | 8/2018 | Hanes | G10L 21/0208 |
| 2019/0043496 A1* | 2/2019 | Tal | G10L 15/08 |
| 2019/0172467 A1 | 6/2019 | Kim et al. | |
| 2019/0362608 A1 | 11/2019 | Horling | |
| 2020/0202850 A1* | 6/2020 | Saraf | G10L 15/22 |
| 2020/0366992 A1* | 11/2020 | Woo | H04R 27/00 |
| 2023/0246872 A1* | 8/2023 | Mackay | H04R 27/00 709/223 |

* cited by examiner

SYSTEM AND METHOD FOR CONTROLLING A MEDIA DEVICE TO PROVIDE AN IMPROVED SONIC ENVIRONMENT FOR THE RECEPTION OF A VOICE COMMAND

CROSS-REFERENCE TO RELATED APPLICATION

This application claims the benefit of U.S. Provisional Patent Application No. 63/086,402, filed Oct. 1, 2020, which is incorporated by reference herein in its entirety.

BACKGROUND OF THE INVENTION

In any given residential environment, it is not uncommon to have multiple media devices in a single room or living space. Such devices would include a multimedia gateway device (such as a digital set-top box), a television, an audio system adapted to play streaming or recorded audio, a gaming system, tablets, smartphones, etc. Each of these devices is quite likely linked (either wirelessly or wired) to a home network and capable of producing an independent audio output.

Given the proliferation of digital assistants and other voice-responsive systems and appliances, both as stand-alone devices and as integral components of other devices, it likely that a one or more voice-responsive systems (will be situated in that same room as the aforementioned media and audio devices. All such voice-responsive systems would typically be linked to the home network and programmed to respond to verbal commands that follow the recitation of a particular activation phrase ("Alexa", "Hey, Google", etc.). The use of an activation phrase minimizes the chance of normal conversation being mistakenly interpreted as a command. However, given the presumed proximity of voice-responsive systems to or more of the media devices, there exists a significant chance that a verbal command would be interfered with, or entirely eclipsed by, the audio output of one or more co-located audio devices.

Although a user could preemptively pause the device programming or lower/mute the volume of one or more of the devices that were producing sound prior to the issuance of a voice command, it would likely prove inconvenient, if not entirely impractical. It is doubtful that a user would embrace the chore of manually pausing or adjusting one or more media devices every time he or she wished to voice a command to a digital assistant or other voice-responsive device. This is especially true given that one of the attributes of such devices is their inobtrusive and seamless use. Uttering a digital assistant command is ideally something that can be done without causing an interruption in a daily routine or a particular task or activity the user might be engaged in. Having to pause/adjust one or more devices, utter a command, and then resume/readjust those same devices is a task no user is likely to enjoy. Consequently, it would be advantageous to provide for a system and method whereby programming would be paused or volume level lowered/muted on one or more active networked media devices prior to the issuance of any spoken voice-responsive system commands. Ideally, the system and method would restore the networked media devices to their previous operational states once the transaction with the voice-responsive device was completed.

BRIEF SUMMARY OF THE INVENTION

A system and method for controlling media systems identified as co-located with one or more voice-command responsive devices. The disclosed technology is responsive to predetermined activation and/or deactivation phrases so as to control the audio output of the identified media systems and provide an improved sonic environment for a voice command to be properly received and interpreted by the voice-command responsive device(s). The activation phrase for the disclosed system and method can be the same one utilized by the co-located voice-command responsive devices, thereby providing a user with an intuitive and substantially immediate means of improving the sonic environment prior to issuing one or more voice commands.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1A:
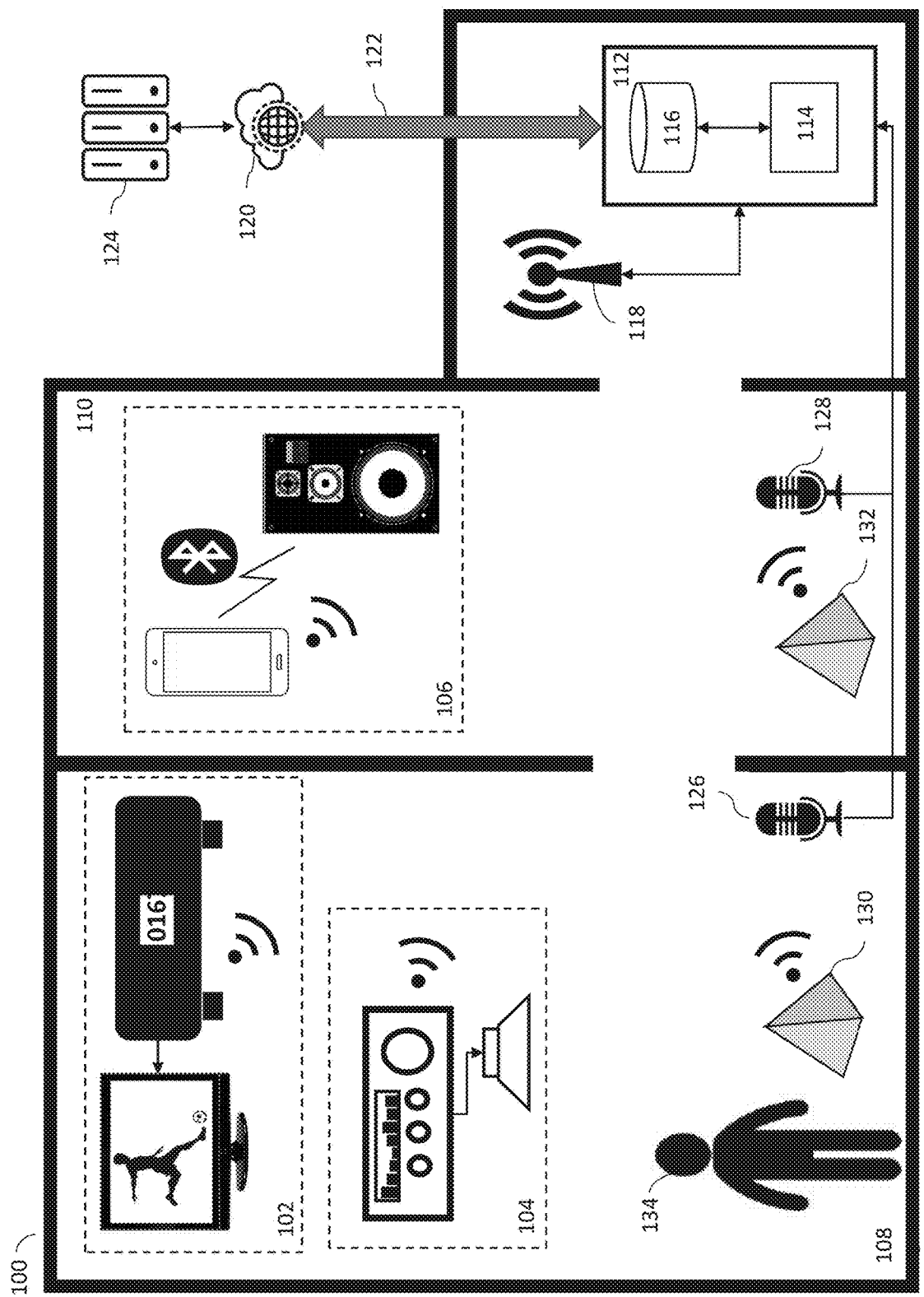
FIG. 1A is a functional block diagram of a preferred embodiment of a system adapted to provide an improved sonic environment for voice commands depicting a user in a first location.

FIG. 1A is a functional diagram of a first preferred embodiment of a system (100) for controlling the programming/volume level of networked media devices in response to a digital assistant recognizing a command phrase. As shown, three media systems (102, 104 and 106), each capable of producing an audio output. Systems 102 and 104 are situated within living room 108, and system 106 is situated in foyer 110. System 102 comprises a set-top box connected to a television; system 106 is an audio system; and system 104 is a smartphone linked to a Bluetooth® speaker. Also shown in FIG. 1A is gateway appliance ("GWA") 112. A cable modem or router would be examples of such an appliance. As shown, the GWA 112 includes processor 114 and memory 116, and is linked to local network wireless transceiver 118. An example of one such transceiver would be an IEEE802.11 Wi-Fi transceiver. GWA 112 is also shown to be linked to external network 120 via broadband connection 122. External network 120 provides GWA 112 with a link to multi-service operator ("MSO") headend 124. GWA 112 would typically be located in the same residence as the media systems, but could be situated in a different room or on a different floor from those systems. Living room microphone 126 is situated within living room 108, and foyer microphone 128 is situated in foyer 110. Both of these microphones are connected to GWA 112. Although the connections are depicted as wired, they could also be wireless. In addition, there could be multiple other, similarly connected microphones throughout the residence; each situated in a particular room and/or associated with a particular digital assistant. GWA 112 is also wirelessly linked to each of the media systems (102, 104 and 106) via the local network supported by wireless transceiver 118.

Also shown in FIG. 1A are digital assistants 130 and 132. Each of these digital assistants are wirelessly linked to GWA 112 via the local network supported by wireless transceiver

118. Digital assistants 130 and 132 are programmed to respond to a variety of verbal commands and requests after a user (134) recites the activation phrase "Attention Assistant".

Processor 112 is programmed to analyze the audio received from microphones 126 and 128, and in particular recognize audio consistent with a user reciting a GWA activation phrase and a GWA deactivation phrase. This GWA activation phrase would ideally be the same activation phrase or phrases utilized by the digital assistants within the residence ("Attention Assistant"). The GWA deactivation phrase could be any phrase that would not likely be used be with great regularity in normal conversation, such as "That will be all, Assistant". Processor 112 is adapted to enable a user to specify particular GWA activation and deactivation phrases by interfacing with GWA 112 via a networked device such as a computer, tablet or smartphone. Processor 112 then stores the GWA activation and deactivation phrases in memory 114.

Figure 2:
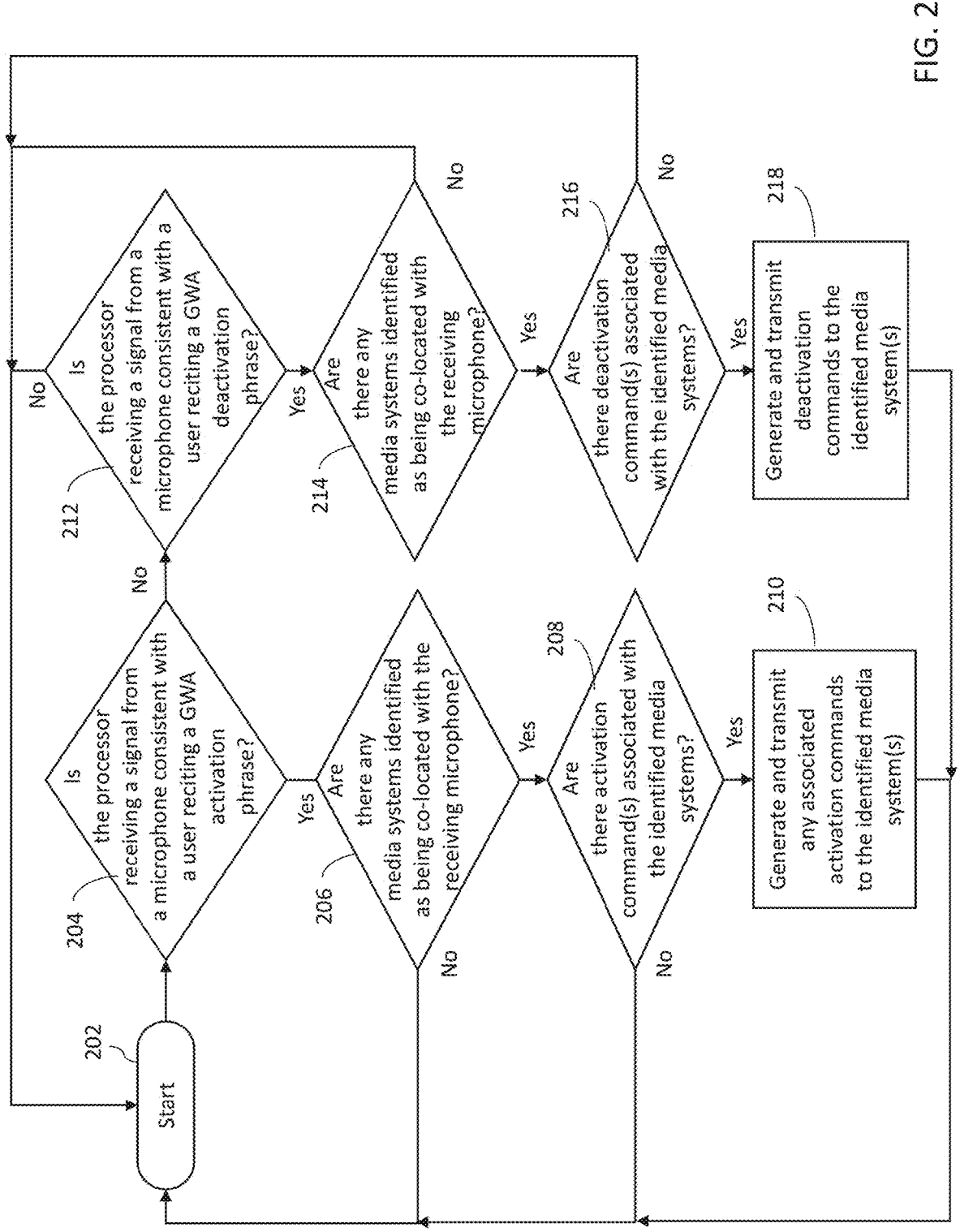
FIG. 2 is a flow diagram of a process supported by the systems of FIGS. 1A and 1B.

The process that system 100 executes with a user in living room 108 is depicted in the flow diagram of FIG. 2. As shown, in steps 202 and 204 the processor determines if a signal from living room microphone 126 consistent with user 134 having spoken the words "Attention Assistant" has been received and analyzed. If so, processor 114 checks the stored information in memory 116 to determine if any media devices have been identified as being co-located living room microphone 126 (and digital assistant 130) (see step 206). The information stored in memory 116 that can be accessed by processor 114 is represented in Table A, below:

living room microphone 126, first checking to determine if the received signal is consistent with the phrase "Attention Assistant" has been spoken (steps 202 and 204). That test would fail and the process would continue with step 212 wherein processor 114 would analyze the received signals to determine if they were consistent with the with the phrase "That will be all, Assistant" having been spoken. If that test fails, the process reverts back to step 202. However, if the conditional is answered in the affirmative, processor 114 determines if any media systems have been identified as associated with foyer microphone 128 (and digital assistant 132) (step 214). If there are no such associated devices the process reverts to step 202. However, as shown in Table A, media systems 102 and 104 have been identified as associated with foyer microphone 128, and the process would continue with step 216. In step 216 the processor determines if the user has stored deactivation commands for the identified media systems in memory 116. (step 216). As shown in table A, there deactivation commands associated with media systems 102 and 104. Accordingly, processor 114 instructs GWA 112 to generate and transmit the associated deactivation commands to media devices 102 and 104 via the local wireless network (step 218). This would result in sending a command to resume playing any previously paused program to media system 102, and a command to raise the volume to its previous level to media system 104. The process then continues with step 202.

Figure 1B:
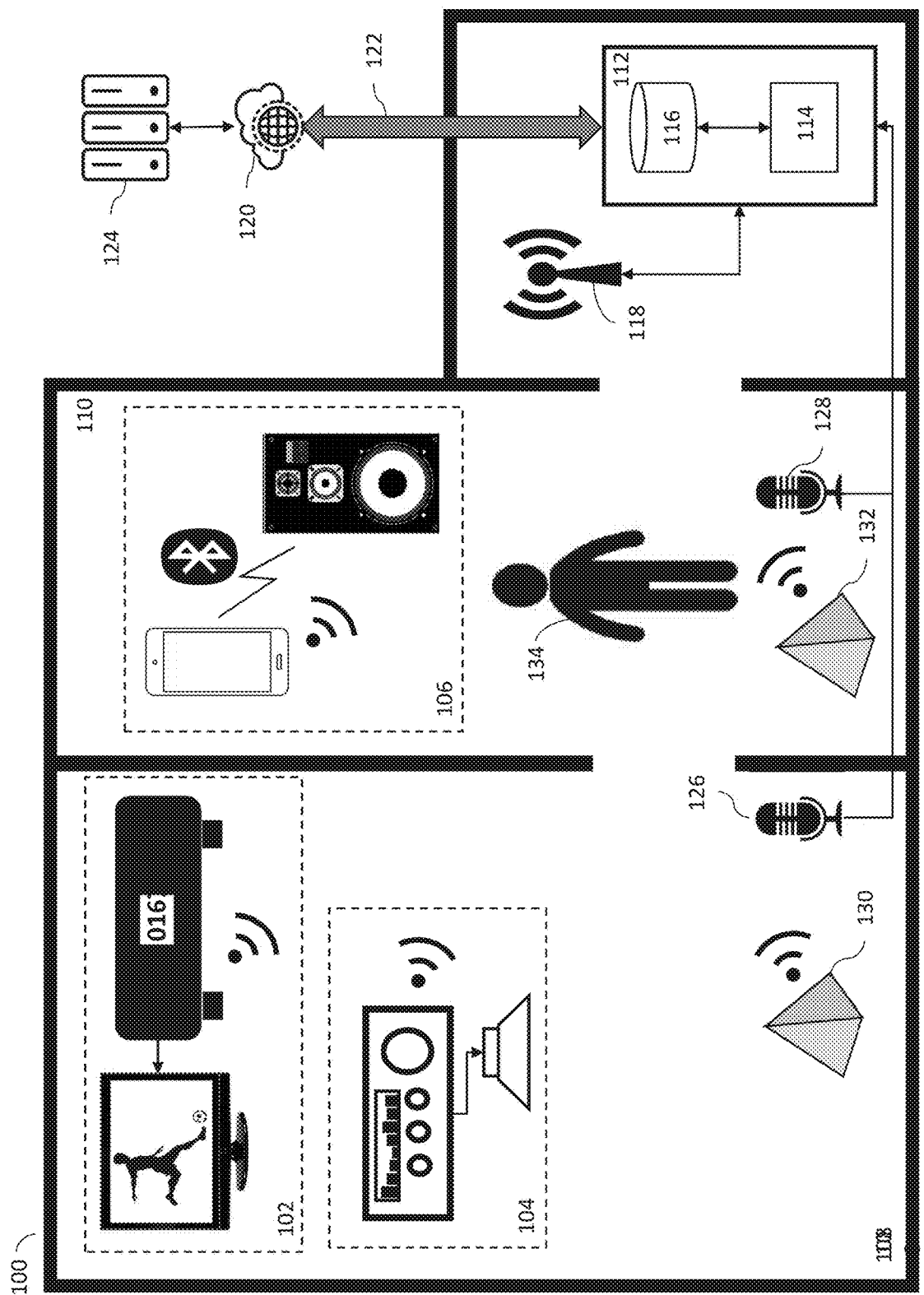
FIG. 1B is a functional block diagram of a preferred embodiment of a system adapted to provide an improved sonic environment for voice commands depicting a user in a second location.

If user 134 were to enter foyer 110, as shown in FIG. 1B, and speak the phrase "Attention Assistant", digital assistant 132 and GWA 112 would react in much the same manner as

| Microphone ID | Associated GWA Activation Phrase | Associated GWA Deactivation Phrase | Associated Media Systems | Activation Command | Completion Command |
|---|---|---|---|---|---|
| Living Room | Attention Assistant | That will be all Assistant | Set-Top Box/TV | Pause Program | Resume Program |
|  |  |  | Audio System | Set volume to 10% of maximum | Restore volume to previous level |
| Foyer | Attention Assistant | That will be all Assistant | Smartphone/ Bluetooth ® Speaker | None | None |

If no such media devices are identified, the process reverts back to step 202. However, if there are identified co-located media devices, processor 114 then queries memory 114 to determine if the user has stored activation commands for the identified media systems (step 208). If not, the process reverts to step 202. However, if associated activation commands have been stored in memory 114, as is the case for media systems 102 and 104, instructs GWA 112 to generate and transmit the associated activation commands to the media devices via the local wireless network (step 210). As shown in Table A, this would result in sending a command to pause any program being viewed to media system 102, and command to lower the volume level to 10% of maximum to media system 104. The process then continues with step 202.

Once the transmitted commands are received by media systems 102 and 104, user 134 will have a much quieter environment in which to recite one or more voice commands for digital assistant 130. When user 134 has complete his or her verbal transaction with digital assistant 130, they would say "That will be all, Assistant" if they desired the various media systems to be returned to their previous states.

If user 134 does recite "That will be all, Assistant", processor 114 would again analyze the signal received from was outlined above with respect to the living room scenario. However, as shown in Table A, the media system identified as being co-located with digital assistant 132 (smartphone and Bluetooth® speaker) has no activation or deactivation command associated with it. Consequently, the processor would determine that a signal from foyer microphone 128 consistent with user 134 having spoken the words "Attention Assistant" had been received (steps 202 and 204). The processor would then determine that media system 106 was identified as being co-located with foyer microphone 128 (and digital assistant 132) (see step 206). However, in step 208 processor 114 would determine that memory 116 stored no associated activation commands for media system 106 (see Table A). Having found no specified activation commands associated with media system 106, the process would revert to step 202 and processor 114 would continue to analyze any signals received from microphones 126 and 128 (steps 204 and 212). No commands would be sent to media system 106 and user 134 would not find the sonic environment within foyer 110 to be any more or less conducive to the reception of voice commands by digital assistant 132 that it was prior to the recitation of the phrase "Attention Assistant".

As shown in FIGS. 1A and 1B, GWA 112 is connected, either directly or indirectly, to external network 120 and MSO headend 124. It will be understood that all or part of the above describe functionality of GWA 112 could be performed by an offsite server or processing means located either at the MSO headend or otherwise connected via the external network. Such offsite processing/storage is commonly employed in support of digital assistants and its implementation and usage is well known in the art.

Although the invention herein has been described with reference to particular embodiments, it is to be understood that these embodiments are merely illustrative of the principles and applications of the present invention. For example, any of the links or connections described as being wireless could be accomplished via wired means (such as Ethernet). The converse holds true for any links or connections described as being wired—They could be accomplished via wireless means without departing from the scope of the disclosed invention. The wireless network supporting the disclosed invention could be any such network capable of supporting the necessary connectivity, such as complying with IEEE 802.11 Wi-Fi, IEEE 802.15 ZigBee, and/or Bluetooth® standards. The microphones utilized by the disclosed system to capture user commands need not be stand-alone devices. The system could utilize microphones embedded in any device or system connected to the local network, such as those found in tablets, smartphones, televisions, computers, set-top boxes, etc. to monitor user voice commands, including the microphone or microphones integral to digital assistants or other voice-responsive devices. Although the above embodiments specify that the voice-responsive device is a digital assistant, the disclosed system and method could be utilized to provide an improved sonic environment for any voice-responsive device or system. Additionally, the media systems that could be controlled via the disclosed technology are in no way limited to those specifically referenced above, nor are the commands that could be communicated to the media systems limited to those mentioned above. For example, the GWA could send a command to a media system instructing it to turn off or turn on, or tune to a particular station or channel, or access a particular source. Media systems could include, but are not limited to: computing systems, computer monitors, gaming systems, radios, tablets, smartphones, audio systems, televisions, projectors, set-top boxes, etc. All of the above variations and reasonable extensions therefrom could be implemented and practiced without departing from the spirit and scope of the present invention as defined by the appended claims.

The invention claimed is:

1. A system for controlling at least one media device, comprising:
   at least one voice-responsive device configured to be activated by an activation phrase and situated in a first room of a residence;
   at least one microphone configured to capture sounds in the first room;
   a plurality of media systems situated in the first room;
   a gateway appliance located in a second room of the residence, remotely from the at least one voice-responsive device and the at least one microphone and including at least one memory and at least one processor, wherein the at least one memory, of the gateway appliance, is configured to store information indicative of:
      the activation phrase;
      the identity and location of the at least one microphone;
      the identity and location of the at least one voice-responsive device;
      the identity and location of the plurality of media systems; and
      at least one first activation command associated with a first media system of the plurality of media systems in the first room;
      at least one second activation command associated with a second media system of the plurality of media systems in the first room;
   at least one network linking (i) the at least one-voice responsive device, (ii) the at least one microphone, (iii) the plurality of media systems, (iv) the at least one memory, and (v) the at least one processor,
   wherein the at least one processor, of the gateway appliance, is configured to:
      receive information indicative of sounds captured by the least one microphone in the first room;
      detect a pattern within the received information consistent with the activation phrase having been spoken;
      retrieve from the at least one memory, of the gateway appliance, based at least in part upon the detection of the pattern, (i) the identity and location of the at least one microphone, (ii) the identity of the plurality of media system in the first room, and (iii) the at least one first activation command associated with the first media system of the plurality of media systems in the first room, and the at least one second activation command associated with the second media system of the plurality of media systems in the first room; and
      communicate the at least one first activation command to the first media system and the at least one second activation command to the second media system.

2. The system of claim 1 wherein the at least one voice-responsive device comprises a digital assistant.

3. The system of claim 1 wherein the at least one first activation command and the at least one second activation command include an instruction for the first media system and second media system, respectively, to execute at least one of the following actions:
   adjust audio volume;
   set audio volume to a predetermined level;
   pause a video program;
   pause an audio program;
   mute audio;
   tune to a particular channel;
   access a particular source;
   power on; and
   power off.

4. The system of claim 1 wherein the first media system and the second media system include at least one of the following:
   a television;
   a radio;
   a gaming system;
   a computing system;
   a computer monitor;
   a tablet;
   a smartphone;
   a projector;
   an audio system;
   a set-top box; and
   a digital assistant.

5. The system of claim 1, wherein the at least one network comprises at least one of:

an 802.11 network;
an 802.15 network;
a Bluetooth network; and
an Ethernet network.

6. The system of claim 1, wherein:
the at least one memory is further adapted to store information indicative of a deactivation phrase; and
the at least one processor is further adapted to:
detect a pattern within the received information consistent with the deactivation phrase having been spoken;
retrieve from the at least one memory, based at least in part upon (i) the detection the pattern consistent with the deactivation phase having been spoken, (ii) the identity and location of the at least one microphone, (iii) the identity of the plurality of media systems, and (iv) at least one first deactivation command associated with the first media system of the plurality of media systems in the first room, and at least one second deactivation command associated with the second media system of the plurality of media systems in the first room; and
communicate the at least one first deactivation command to the first media system and the at least one second deactivation command to the second media system.

7. The system of claim 6 wherein the at least one voice-responsive device comprises a digital assistant.

8. The system of claim 6 wherein the at least one first deactivation command and the at least one second deactivation command comprises an instruction to for the first media system and the second media system to execute at least one of the following actions:
adjust audio volume;
set audio volume to a predetermined level;
pause a video program;
pause an audio program; mute audio;
tune to a particular channel;
access a particular source;
power on; and
power off.

9. The system of claim 6 wherein the first media system and the second media system includes at least one of the following:
a television;
a radio;
a gaming system;
a computing system;
a computer monitor;
a tablet;
a smartphone;
a projector;
an audio system;
a set-top box; and
a digital assistant.

10. The system of claim 6 wherein the at least one network comprises at least one of:
an 802.11 network;
an 802.15 network;
a Bluetooth network; and
an Ethernet network.

11. A method for controlling at least one media device comprising in a system, comprising:
at least one voice-responsive device configured to be activated by an activation phrase and situated in a first room of a residence;
at least one microphone configured to capture sounds in the first room of the residence;
a plurality of media systems situated in the first room residence;
a gateway appliance located in a second room of the residence, remotely from the at least one voice-responsive device and the at least one microphone and including at least one memory, wherein the at least one memory, of the gateway appliance, is configured to store information indicative of:
the activation phrase;
the identity and location of the at least one microphone;
the identity and location of the at least one voice-responsive device;
the identity and location of the plurality of media systems;
at least one first activation command associated with a first media system of the plurality of media systems in the first room; and
at least one second activation command associated with a second media system of the plurality of media systems in the first room;
at least one network linking (i) the at least one-voice responsive device, (ii) the at least one microphone, (iii) the plurality of media systems, and (iv) the at least one memory;
the method comprising the steps of:
receiving information indicative of sounds captured by the least one microphone in the first room;
detecting a pattern within the received information consistent with the activation phrase having been spoken;
retrieving from the at least one memory, based at least in part upon the detection the pattern, (i) the identity and location of the at least one microphone, (ii) the identity of the plurality of media systems in the first room, and (iii) the at least one first activation command associated with the first media system of the plurality of media systems in the first room, and the at least one second activation command associated with the second media system of the plurality of media systems in the first room; and
communicating the at least one first activation command to the first media system and the at least one second activation command to the second media system.

12. The method of claim 11 wherein the at least one voice-responsive device comprises a digital assistant.

13. The method of claim 11 wherein the at least one first activation command and the at least one second activation command include an instruction for the first media system and the second media system to execute at least one of the following actions:
adjust audio volume;
set audio volume to a predetermined level;
pause a video program;
pause an audio program;
mute audio;
tune to a particular channel;
access a particular source;
power on; and
power off.

14. The method of claim 11 wherein the one first media system and the one second media system include at least one of the following:
a television;
a radio;
a gaming system;

a computing system;
a computer monitor;
a tablet;
a smartphone;
a projector;
an audio system;
a set-top box; and
a digital assistant.

15. The method of claim 11 wherein the at least one network comprises at least one of:
an 802.11 network;
an 802.15 network;
a Bluetooth network; and
an Ethernet network.

16. The method of claim 11 wherein:
the at least one memory is further adapted to store information indicative of a deactivation phrase; and further comprising the steps of:
detecting a pattern within the received information consistent with the deactivation phrase having been spoken;
retrieving from the at least one memory, based at least in part upon (i) the detection of the pattern consistent with the deactivation phase having been spoken, (ii) the identity and location of the at least one microphone, (iii) the identity of the plurality of media systems, and (iv) at least one first deactivation command associated with the first media system of the plurality of media systems in the first room, and at least one second deactivation command associated with the second media system of the plurality of media systems in the first room; and
communicating the at least one first deactivation command to the first media system and the at least one second deactivation command to the second media system.

17. The method of claim 16 wherein the at least one voice-responsive device comprises a digital assistant.

18. The method of claim 16 wherein the at least one first activation command and the at least one second activation command include an instruction for the first media system and the second media system to execute at least one of the following actions:
adjust audio volume;
set audio volume to a predetermined level;
pause a video program;
pause an audio program;
mute audio;
tune to a particular channel;
access a particular source;
power on; and
power off.

19. The method of claim 16 wherein the first media system and the second media system include at least one of the following:
a television;
a radio;
a gaming system;
a computing system;
a computer monitor;
a tablet;
a smartphone;
a projector;
an audio system;
a set-top box; and
a digital assistant.

20. The method of claim 16 wherein the at least one network comprises at least one of:
an 802.11 network;
an 802.15 network;
a Bluetooth network; and
an Ethernet network.

* * * * *